Figure 1:
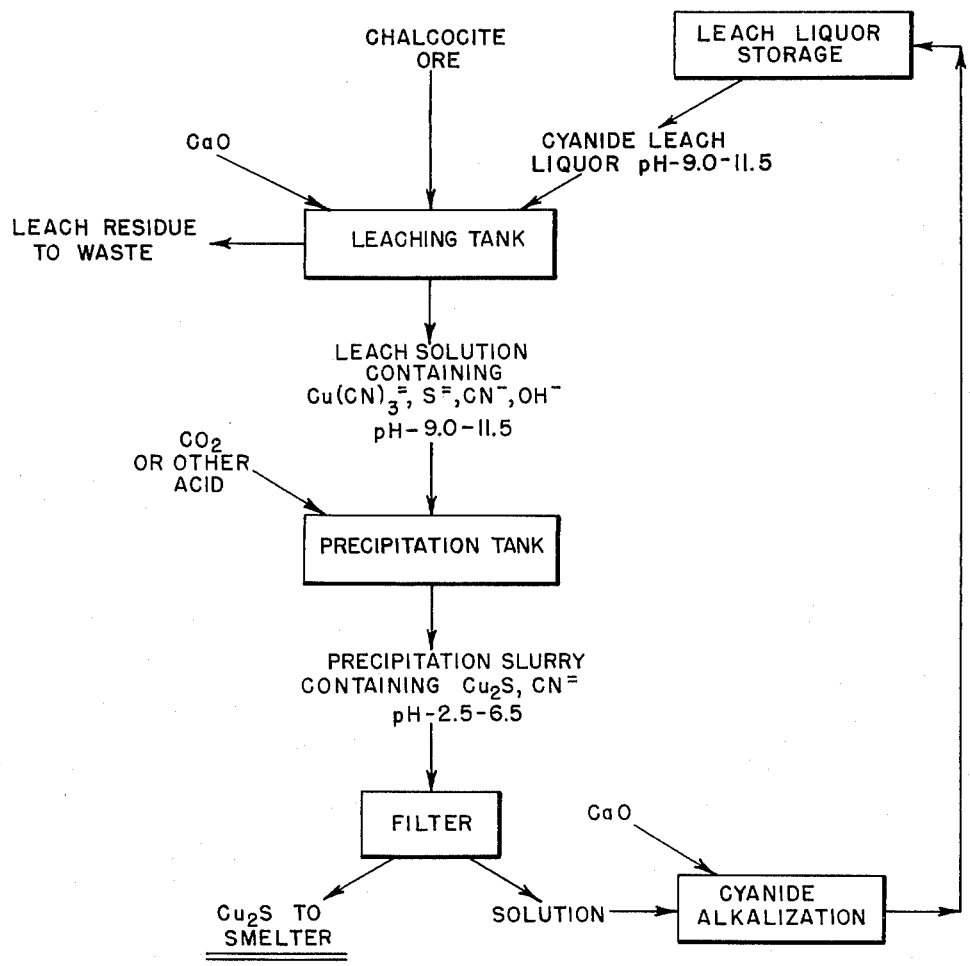

INVENTORS
WILLIAM A. HOCKINGS
DONALD H. ROSE
ANTOINE M. GAUDIN

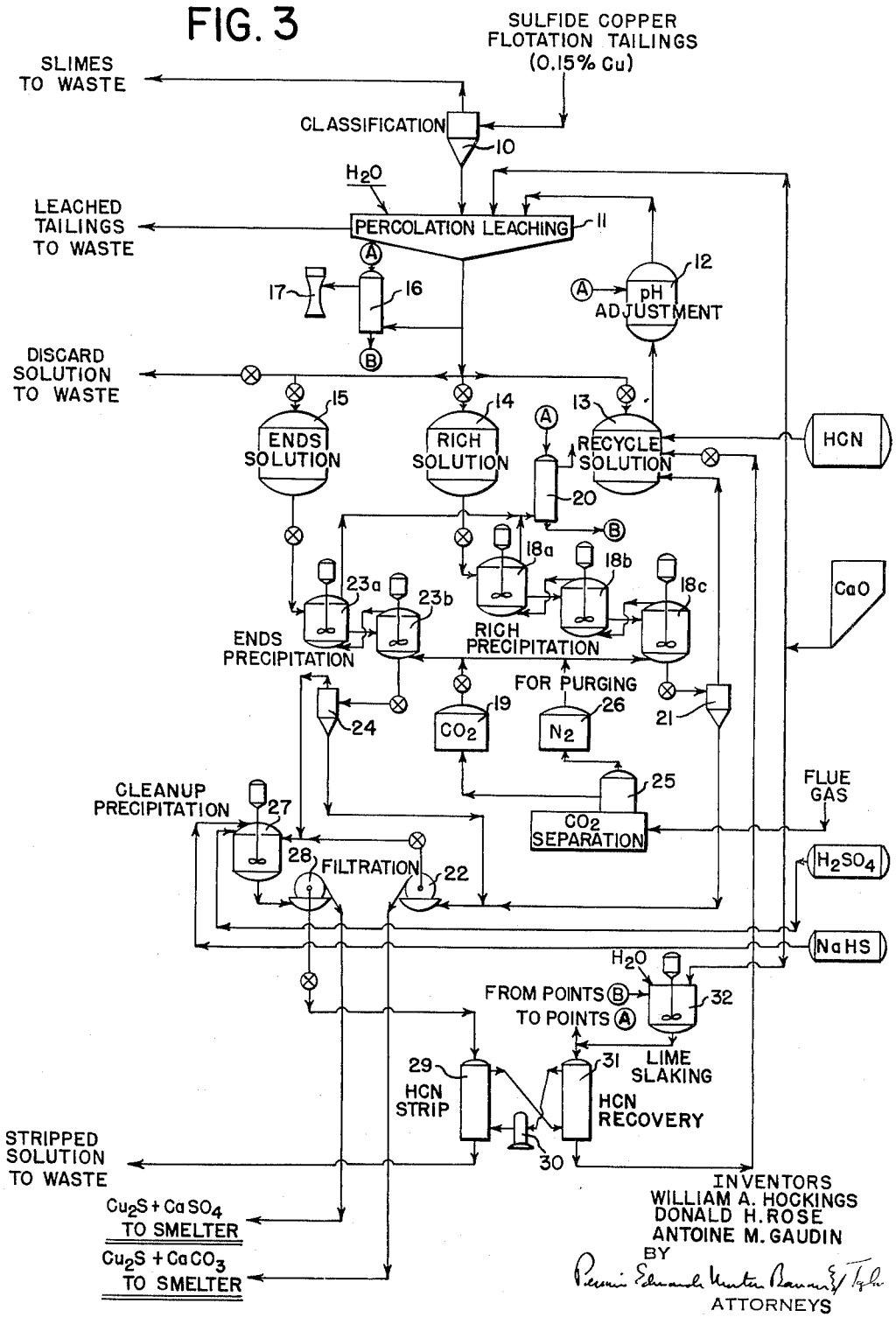

United States Patent Office 3,224,835
Patented Dec. 21, 1965

3,224,835
TREATMENT OF SULFIDIC MATERIAL
William A. Hockings, Houghton, and Donald H. Rose, Lake Linden, Mich., and Antoine M. Gaudin, Cambridge, Mass., assignors to Copper Range Company, New York, N.Y., a corporation of Michigan
Filed Jan. 19, 1962, Ser. No. 167,245
13 Claims. (Cl. 23—135)

This invention relates to the treatment of sulfidic cupriferous material, and has for its principal object the provision of an improved method for the treatment of sulfidic material containing copper in the cuprous form for the recovery of its copper content. The method of the invention involves leaching such sulfidic copper bearing material with an aqueous alkaline cyanide solution at a pH substantially above 7.4 under non-oxidizing conditions to dissolve the copper content of such material, and thereafter reducing the pH of the pregnant leach solution, still under essentially non-oxidizing conditions, to a value below 7.4, whereby cuprous sulfide is precipitated and may be recovered in concentrated form.

The method of the invention may be employed with advantage in the treatment of a variety of sulfidic minerals and other materials containing copper in the cuprous form. It may for example be applied successfully to the treatment of the tailings resulting from concentration by froth flotation of chalcocite and other sulfide ores of copper, when the copper content of such tails is too low to be recovered by conventional methods. It may be applied directly to the treatment of sulfidic copper ores in which chalcocite and other copper bearing minerals are very finely disseminated, so that flotation concentration of the ore is difficult or is accompanied by a high production of difficulty treated slimes. It may indeed be applied to the treatment of conventional sulfide copper ores even though such ores might be amenable to treatment by conventional methods, for by the method of the invention a cuprous sulfide product exceptionally easy to treat in a copper smelting furnace or converter is recovered economically and efficiently.

When sulfidic copper bearing material containing cuprous copper is treated under non-oxidizing conditions with an aqueous alkaline cyanide solution, the cuprous sulfides dissolve readily and substantially completely in the solution. The copper content of the sulfidic material enters solution as a cuprocyanide complex, and the sulfide component enters and remains stable as sulfide ion in the alkaline solution so long as non-oxidizing conditions prevail. When such solution, containing cuprocyanide and sulfide ions, is treated to reduce its pH to below 7.4, cuprous sulfide is precipitated. This precipitate is a concentrated product which can be readily separated from the residual solution. The solution, upon being alkalized, regenerates alkaline cyanide solution which may be used in treating a further portion of the sulfidic copper bearing material.

Based on the foregoing, the method of the invention involves treating sulfidic copper bearing material containing copper in the cuprous form by leaching such material under substantially non-oxidizing conditions with an aqueous alkaline cyanide solution having a pH substantially above 7.4, separating the pregnant leach solution from the leached residue, reducing the pH of the separated pregnant solution to a value below 7.4, whereby cuprous sulfide is precipitated therefrom, and recovering the precipitated cuprous sulfide. By alkalizing the cyanide content of the solution after separation from it of the precipitated cuprous sulfide, cyanide solution suitable for leaching is regenerated, and the resulting alkaline solution is advantageously recycled for reuse in the leaching operation.

While an acidifying agent may be employed with success to reduce the pH of the pregnant leach solution in order to precipitate cuprous sulfide, carbon dioxide is a particularly satisfactory and inexpensive reagent for this purpose. Alkalinity of the leach solution advantageously is established by using slaked lime as the alkalizing agent. Calcium ions thereby introduced into the leach solution are precipitated as calcium carbonate when carbon dioxide is used to precipitate the cuprous sulfide. The calcium carbonate precipitate may be formed and separated from the residual solution along with the cuprous sulfide. By stepwise reduction of the pH of the pregnant leach solution, the calcium carbonate may be partially precipitated first and separated from the solution, prior to reducing the pH of the solution to the point at which cuprous sulfide is precipitated. Alternatively, stepwise reduction of the pH may be carried out so as to form a first precipitate containing a relatively high proportion of calcium carbonate and a relatively low proportion of cuprous sulfide, and then by further reduction of the pH of the solution to form a second precipitate in which the proportion of the cuprous sulfide to calcium carbonate is relatively high.

Oxidation of the cupriferous material being treated or of the leach liquor should be avoided because it entails undesirable loss of cyanide. Although copper in the cupric form is readily dissolved in an alkaline cyanide leach solution and will precipitate when the pH is lowered to neutrality or below, an undesirable loss of both cyanide and sulfide from the solution is entailed.

Figure 2:
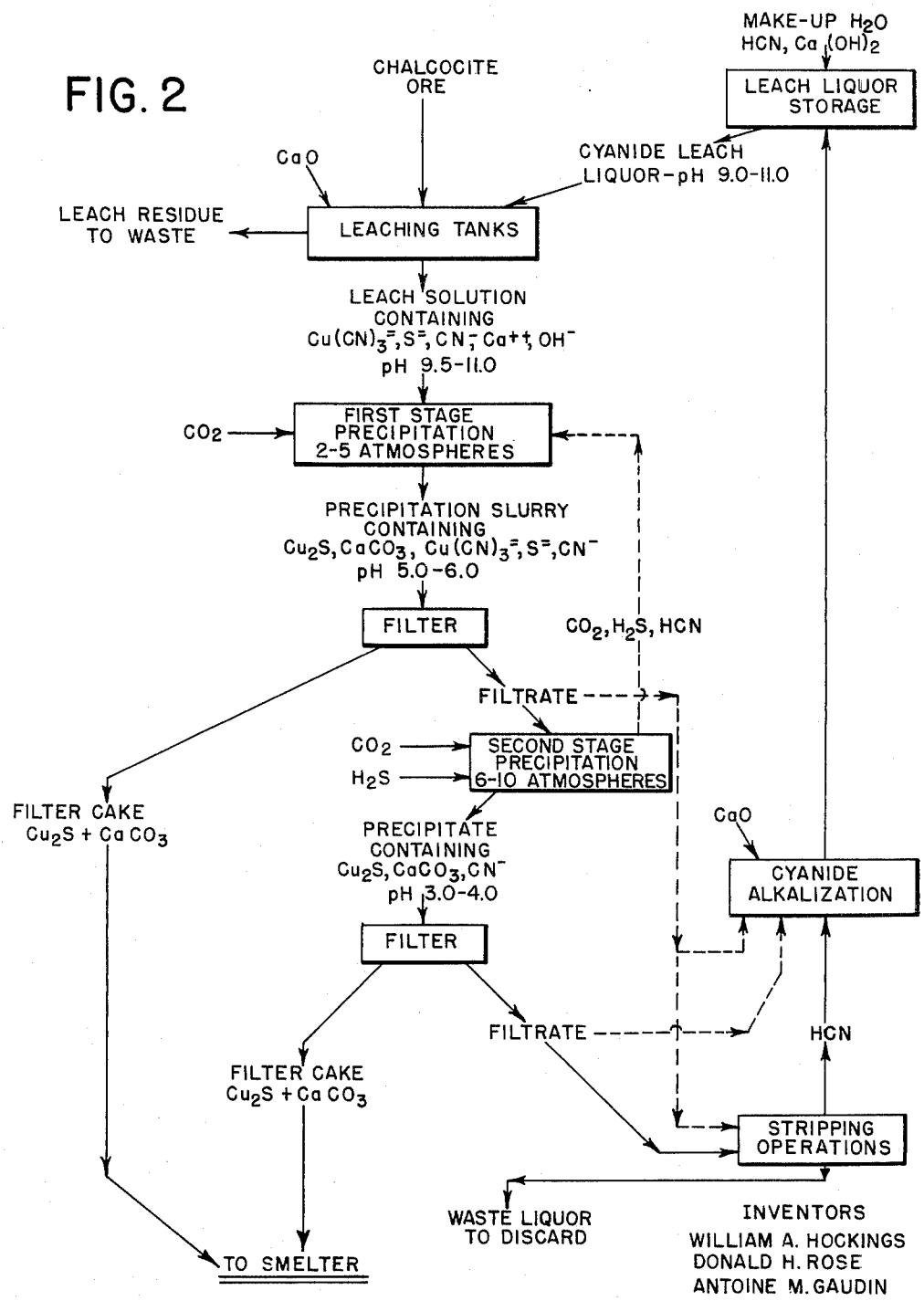

The foregoing and other features of the invention are more fully disclosed below in the following detailed description of specific examples of the new method. The following descriptions make reference to the accompanying drawings, in which FIG. 1 is a flow sheet showing the basic steps of the process;

FIG. 2 is a flow sheet of a modification of the basic process in which the pregnant leach solution is subjected to stepwise pH reduction; and FIG. 3 is a flow sheet of an advantageous embodiment of the proces utilizing percolation leaching for treating a low grade copper bearing flotation tailing.

The basic steps of the process are shown on the flow sheet constituting FIG. 1 of the drawings. For simplicity of description, the flow sheet indicates treatment of a chalcocite ore for the production of a cuprous sulfide product well suited to direct smelting to produce metallic copper. It is understood however, that the basic flow sheet is applicable also to the treatment of other sulfidic copper bearing materials containing copper in the cuprous form, such as flotation concentrates (to eliminate slag forming constituents such as iron and silica), flotation tailings or middlings (to recover small residues of copper not collected in the flotation concentrates) and other sulfidic materials containing cuprous copper.

The ore or other material treated is prepared in any conventional manner for leaching. Such preparation basically involves crushing the ore sufficiently to provide easy access of the leach solution to the copper mineral grains and to assure reasonably rapid and complete dissolution of the copper in the leach solution. If a flotation concentrate or tailing is the material being treated, no further preparation generally is necessary.

The ore is charged into a leaching tank, where it is brought into contact with an aqueous alkaline cyanide leach liquor. Lime advantageously is charged with the ore into the leaching tank, to flocculate the ore and thus improve percolation of the leach solution through it, and to provide alkalinity for the leach solution. By charging lime with the ore, the lime is uniformly distributed through the ore and significant local variation in alkalinity of the leach liquor is avoided.

The leaching tank preferably is a closed vessel from which air is excluded, so that the leaching operation takes place under essentially non-oxidizing conditions. For example, after a charge of ore has been delivered into the leaching tank, leach liquor may be introduced into the tank until all air has been displaced therefrom, and the tank may then be closed to exclude further access of air. For more rigorous establishment of non-oxidizing leaching conditions, the leaching tank may be closed after the ore charge has been introduced and then the tank may be purged with nitrogen or other non-oxidizing gas prior to introducing the leach liquor.

The leach liquor is an aqueous solution containing cyanide ions and should be at a pH above 9.0. An advantageous pH is in the range of 9.0 to 11.5. However, the pH of the solution as it is delivered on to the ore is not especially important, so long as it is distinctly alkaline, and so long as enough lime is provided in the ore charge to bring its pH to the desired high value in the leaching tank.

The cyanide ions may be supplied in any desired form, but most advantageously by dissolving hydrogen cyanide in the alkaline solution. However, sodium or potassium cyanide, or calcium cyanide or cyanamide, or other commercial cyanide or cyanide-yielding agent, may serve as the source of cyanide ions. The concentration of cyanide in the leach liquor is not particularly critical. Naturally, an excessively dilute leach liquor is undesirable because very large volumes will then be required for extraction of a modest amount of copper. High cyanide concentrations also are to be avoided because such solutions generally must be handled with particular care, and call for the use of careful washing techniques and other treatments to avoid excessive loss of cyanide or metal values with discards or solution losses from the process. Generally speaking, a cyanide concentration in the range from 2 to 25 grams per liter is satisfactory; and for most commercial operations of the process a cyanide concentration in the narrower range from 5 to 20 grams per liter (calculated as CN) is preferred.

The alkaline pH of the leach liquor may be established with any desired alkalizing agent. Lime, slaked or unslaked, is the most inexpensive alkalizing agent for commercial use and is generally preferred; but in special cases, if desired, other soluble alkalizing agents such as caustic soda or caustic potash may be employed. As an example, a satisfactory cyanide leach liquor is an aqueous solution containing about 0.7% by weight of dissolved HCN and sufficient slaked lime to establish a pH of 10.5.

Any of the well known leaching procedures for extracting metal values from ores and other metallurgical materials may be employed, such as batch leaching with or without agitation, percolation leaching (upward or downward), or continuous countercurrent leaching. For purposes of the basic process illustrated in FIG. 1, it is assumed that simple batch leaching of a charge of copper sulfide ore is carried out by agitating the charge and the leach liquor in the leaching tank until substantially all of the copper content of the ore has been dissolved in the leach solution. The leach solution then is separated in any desired fashion from the undissolved residue of the ore, for example by decantation or filtration, and is transferred to a precipitation tank. The undissolved leach residue is discharged from the leaching tank to waste.

The withdrawn leach solution contains cuprocyanide ions and sulfide ions dissolved from the ore, together with excess cyanide ions, and is still substantially as alkaline as the original leach liquor, its pH being generally in the range from 9 to 11. The cuprocyanide complex is indicated on the drawing as a tricyano complex, but it is of course understood that it generally will be a mixture of complexes containing various proportions of copper to cyanide. While not intentional, there may be some small diminution in the pH of the leach solution, as compared with the original leach liquor, if lime is not added to the ore charge, owing to dilution by moisture present in the ore charge or to side reactions of the alkaline liquor with acidic constituents of the ore.

The leach solution is treated in the precipitation tank with an acidifying agent to reduce its pH to below 7.4, and preferably to a value between 2.5 and 6.5. Cuprous sulfide begins to precipitate from a solution in which it is present at substantially the saturation concentration (near 6 grams per liter) at a pH of about 7.4, and upwards of 90% of a saturation concentration is precipitated at a pH of 2.5. Various proportions of the saturation concentration are precipitated at intermediate values of pH, e.g. about 10% is precipitated at a pH of 7.0, about 25% at a pH of 6.5, about 45% at a pH of 6.0, and about 70% at a pH of 5.5. Acidification of the leach solution takes place, like leaching, in a closed vessel from which air is excluded, so as to maintain the non-oxidizing conditions which prevail during leaching. Any acidifying agent may be used for reducing the pH of the leach solution in the precipitation tank. For example, mineral acids such as sulfuric acid have been employed with success, as have acid anhydrides such as sulfur dioxide. Generally, the cheapest and most satisfactory acidifying agent is carbon dioxide, which can be readily produced from flue gases resulting from the combustion of carbonaceous fuels.

Acidification of the solution with carbon dioxide is accompanied by precipitation of calcium ions (from lime alkalization) as calcium carbonate. Some calcium carbonate will precipitate when a solution containing lime is treated with carbon dioxide at a pH as high as 10.5. Hence the precipitate formed when the pregnant leach solution is treated with carbon dioxide is a mixture of cuprous sulfide and calcium carbonate. When the pH of such solution which was originally alkalized with lime is reduced to about 6.0, for example, about 45% of the dissolved copper and about 60% of the lime will precipitate.

Precipitation of the copper is accompanied by liberation, as cyanide ions or ionizable hydrogen cyanide, of the cyanide component of the dissolved cuprocyanide complex. Thus, available cyanide in solution is regenerated in proportion to the amount of copper precipitated.

When the pH of the leach solution has been reduced to the desired value in the precipitation tank, the slurry of cuprous sulfide and calcium carbonate in residual solution is transferred to a filter, where the precipitate is separated from the solution. The filter cake constitutes the concentrated copper bearing product of the process and may be disposed of in any desired fashion. It constitutes an excellent charge component to a reverberatory smelting furnace or converter, wherein it may easily be reduced to metallic copper.

Under the substantially non-oxidizing conditions which prevail throughout the process, the cyanide contained in the leach solution undergoes no degradation to cyanate or thiocyanate and hence there is substantially no loss of cyanide on account of such side reactions. The cyanide ions simply reversibly combine with the copper content of the material leached. At the high pH prevailing during leaching, the cyanide combines with the copper of the sulfidic raw material and forms soluble cuprocyanide ions, and concurrently liberates the sulfide component of the dissolved copper as soluble sulfide ions. When the pH of the leach solution is reduced, the sulfide ions recombine with the copper, regenerating cyanide in solution.

The cyanide content of the solution effluent from the cuprous sulfide filtration therefore requires only a further pH adjustment, to restore its alkalinity, in order to render it suitable for reuse in the leaching operation. To this end the filtrate from the filtering operation may be subjected to a stripping operation to strip it of cyanide which is then dissolved in an alkaline solution, or such filtrate may be delivered directly to an alkalization tank where it is treated with any desired alkalizing agent. Lime, slaked or unslaked, is the most inexpensive and convenient alkalizing agent to employ, and is therefore preferred. Sufficient lime or other alkalizing agent is incorporated in the solution to increase its pH again to the value of the original leach liquor; and the alkalized solution is thereupon returned to the leach liquor storage tank from which it is delivered to the leaching operation. As indicated above, calcium ions introduced into the leach liquor as a consequence of using lime to establish its high alkalinity are precipitated as calcium carbonate when the leach solution is acidified with carbon dioxide to precipitate cuprous sulfide, and the precipitated calcium carbonate is separated from the solution along with the cuprous sulfide. Such calcium carbonate constitutes the only substantial impurity in the copper sulfide product of the process. It is readily eliminated by decomposition and slagging when this product is smelted to metallic copper in a smelting furnace or converter. The precipitation of calcium from the leach solution along with the cuprous sulfide precludes objectional build up of calcium ions in the course of repeated cycling of the solution through the process.

The basic process of the invention as described above and shown on the flow sheet of FIG. 1 is subject to a wide variety of modifications to reduce consumption of reagents, to increase the recovery of cuprous sulfide per unit volume of leach solution handled, to reduce losses of reagents and other values in discards from the process, and for other purposes. One such modification, by which a cuprous sulfide product of increased grade may be produced and an increased recovery of cuprous sulfide per unit volume of leach solution handled is attained, is illustrated by the flow sheet of FIG. 2.

As with the flow sheet of FIG. 1, it is assumed in the flow sheet of FIG. 2 that the raw material being treated is a chalcocite ore, suitably ground in preparation for leaching. However, as pointed out above, other sulfidic materials containing cuprous copper may constitute the raw material to be treated for recovery of its copper values.

The sulfidic raw material is leached under substantially non-oxidizing conditions with a cyanide leach liquor, substantially as described above with reference to FIG. 1. Lime may with advantage be mixed with the ore charged to the leaching operation. Leaching may be carried out in any desired fashion, either as a batch leaching operation or as a continuous leaching operation, with or without agitation of the charge during leaching. The leaching tank preferably is a closed vessel from which air is excluded to establish the desired non-oxidizing leaching conditions. Air may be displaced from the leaching tank, prior to commencement of the leaching operation, either by purging the tank by means of a current nitrogen or other non-oxidizing gas after charging with ore, or by displacing the air from the tank by running in leach solution until the charge is completely inundated and all air displaced, after which the tank is closed.

The leach liquor with which the ore (or other sulfidic copper bearing material) is leached in an aqueous alkaline solution containing cyanide ions and having a pH preferably in the range from 9.0 to 11.5. It is assumed that the alkalinity of the leach liquor has been established by addition thereto of the requisite quantity of slaked lime, so that the leach liquor contains calcium ions in addition to cyanide ions. A suitable leach liquor contains from 2 to 25 grams per liter of cyanide, for example 7 grams per liter, at a pH of 10.0, and calcium ions at a concentration corresponding to having established such pH solely by treatment of the solution with slaked lime. Additional lime charged with the ore into the leaching tank may increase the pH of the solution during leaching.

In the course of the leaching operation substantially the entire copper content of the ore or other material being treated is dissolved in the form of cuprocyanide ions; and under the prevailing non-oxidizing conditions the sulfide constituent of the cupriferous material enters solution in the alkaline liquor as soluble sulfide ions. At the conclusion of the leaching operation, when substantially complete extraction of copper from the raw material into the solution has been attained, the leach solution is decanted, filtered or otherwise separated from the undissolved leach residue, and the latter is discharged to waste.

The separated leach solution contains dissolved copper in the form of cuprocyanide complex, sulfide ions from the dissolved copper sulfide (indicated on the flow sheet as a tricyano complex but probably in fact a mixture of di-, tri-, and tetracyano complexes) excess cyanide ions, and calcium ions, at a pH in the range from 9.0 to 11.0. The pH may have been reduced somewhat by dilution of the solution with moisture present in the material leached, or by interaction of the alkaline pulp with acid constituents of such material, or by a combination of these occurrences, or it may have been increased by lime present in the charge being leached. Generally, the pH of the leach solution will be in the range from 9.5 to 11. Typically, the effluent leach solution from the leaching tanks may contain about 5.5 grams per liter of dissolved copper and have a pH of about 10.5.

The leach solution is subjected to a first stage precipitation treatment to effect partial precipitation of the dissolved calcium ions, and generally also part of the dissolved copper. The solution is treated with carbon dioxide under a pressure of 2 to 5 atmospheres, whereby its pH is reduced to a value in the range from 5.0 to 6.0. About 60% of the dissolved calcium precipitates as carbonate at a pH of 6.0, and nearly 80% at a pH of 5.0, within a fairly short period of time (10 to 40 minutes). Concurrently cuprous sulfide is precipitated—about 45% of the dissolved copper is precipitated at a pH of 6.0, and over 80% at a pH of 5.0. Thus in this operation most of the calcium and much of the copper may be precipitated from the solution, and the grade of the precipitate (i.e. the proportion of calcium carbonate to cuprous sulfide it contains) may be controlled, within limits, by controlling the pH at which precipitation takes place.

If it is desired to eliminate part of the dissolved calcium without precipitating copper, either before or during the first precipitation operation such may be done by limiting the carbon dioxide introduced into the solution so that the pH of the solution does not decrease below about 7.5. Under such condition about 25% of the dissolved calcium will precipitate as calcium carbonate, without any copper precipitating. This calcium carbonate may be separated from the solution; and thereafter precipitation of copper will result in a precipitate relatively leaner in calcium carbonate than would be the case otherwise.

For most commercial operations, however, it is not worth the cost and effort of a special precipitation step to separate the 25% or so of calcium that can be eliminated in this fashion. It is generally preferable to reduce the pH of the leach solution to 6.0 or below in the first precipitation operation, and thereby form a precipitate which contains most of the calcium and a substantial part of the copper. Such a precipitate is a very satisfactory product to treat in a copper smelter for recovery of its copper content.

The precipitate formed in the first stage precipitation is filtered or otherwise separated from the residual solution. Filtration may be carried out at the same super-atmospheric pressure as the precipitation operation itself, or after reduction of the pressure on the solution to atmospheric. The filter cake separated out is one of the products of the process, and the filtrate is subjected to further treatment.

The further treatment particularly contemplated for the filtrate in the process of FIG. 2 is to subject it to a second precipitation operation. In this second stage precipitation the solution is treated at a pressure of 6 to 10 atmospheres with carbon dioxide, and preferably also with hydrogen sulfide or other soluble sulfide. Under these conditions the pH of the solution is reduced still further, to a value preferably in the range from 2.5 to 3.0, with the result that most of the copper remaining in solution is precipitated as cuprous sulfide, and coincidentally whatever further portion of dissolved calcium that can be precipitated is thrown out of solution. Thus there is formed a further precipitate which is essentially a mixture of cuprous sulfide and calcium carbonate; but this second stage precipitate contains a relatively higher proportion of cuprous sulfide to calcium carbonate than does the first stage precipitate. Indeed, most of the precipitable calcium carbonate may have been formed in the first stage precipitation, so that the second stage precipitate is essentially all cuprous sulfide.

Treatment of the solution with hydrogen sulfide or other soluble sulfide during conduct of the second stage precipitation is desirable to increase the sulfide ion concentration in the solution and thus promote precipitation of cuprous sulfide. Two-thirds atmospheric partial pressure of hydrogen sulfide in the second stage precipitation results in a substantial increase in the percentage of dissolved copper precipitated in a reasonable period of time.

Of course, not all of the carbon dioxide or hydrogen sulfide delivered to the second stage precipitation tank will dissolve in and remain dissolved in the solution being treated. Moreover, carbon dioxide will escape from the solution when (and if) its pressure is reduced to atmosphere. Also, some hydrogen cyanide will become evolved from the solution in the acid condition in which it is following the second stage precipitation. These evolved gases from the cuprous sulfide precipitation are collected and are advantageously employed for carbonating the alkaline leach solution in the first stage precipitation operation. If the volume of these gases is insufficient to reduce the pH to the desired value, additional carbon dioxide from an extraneous source can be supplied to the first stage precipitation operation.

The precipitation slurry withdrawn from the second stage precipitation tank is an acid cyanide solution containing cuprous sulfide and usually some calcium carbonate in suspension and cyanide (both dissociated and undissociated into cyanide ions) in solution. As indicated above, the pH of the solution will preferably be in the range from 2.5 to 3.0. In order to insure against escape of hydrogen cyanide from this acid solution, it is handled in closed equipment; and adequate provisions should be made to warn of any escape of cyanide gas.

The slurry is filtered to separate the precipitated cuprous sulfide and calcium carbonate from the residual solution. Filtration may be carried out at the same pressure as the second stage precipitation, or at a lower pressure. Provided filtration takes place reasonably promptly after reduction of pressure, the amount of precipitate that redissolves is small. The cuprous sulfide precipitate thus recovered forms an excellent charge for treatment in a copper smelter. After washing, if such is desired, it may be contaminated with a relatively small quantity of calcium carbonate, depending upon how effectively calcium ions were precipitated and separated from the solution during the first stage precipitation, but otherwise this precipitate is substantially pure cuprous sulfide.

The filtrate remaining after separation of the second stage precipitate is treated for recovery and recycling of its cyanide content. In order to be able to dispose of accumulations of wash waters, dissolved salts, etc., it is preferable for the process to include a stripping operation in which the filtrate from the second stage precipitation is treated in whole or in part to strip from it the cyanide it contains. The recovered cyanide is alkalized with lime and the resulting alkaline cyanide solution is recycled for use in the leaching operation. A portion (sometimes a substantial portion) of the filtrate from the second stage precipitate may be by-passed around the stripping operation and delivered directly to the cyanide alkalization operation. Also, some of the filtrate from the first stage precipitate may, if desired, be delivered directly to the stripping or cyanide alkalization operation, or to both. Waste liquor (mainly excess water containing excess dissolved salts which are to be eliminated from the process) are discarded to waste from the stripping operation.

The flow sheet of FIG. 3 shows an advantageous embodiment of the above-described fundamental features and certain advantageous refinements of the new process described above. The embodiment of the invention shown in FIG. 3 is for the treatment of flotation tailings remaining after recovery of a copper concentrate from ore in which copper is present mainly as chalcocite. The flotation tailings which constitute the feed to the process are finely ground (100% minus 35-mesh) and are received in an aqueous pulp containing typically 25% by weight of solids. The copper content of the tailings is much too low (about 0.15% by weight of the solids) for recovery by any heretofore commercially practical method.

The tailings pulp is first delivered to a hydrocyclone 10 for separation of slimes and thickening of the sands. The slimes are discarded to waste, because of the practical difficulty of leaching them.

The thickened sands are passed from the hydrocyclone to a closed leaching tank 11, in which they are leached by downward percolation through them of an alkaline cyanide solution. Lime also may be charged into the leaching tank, to flocculate the mass of tailing sands and to insure uniform alkalinity of the leach solution during leaching. The leach solution, containing for example 7.0 grams per liter of cyanide (calculated as CN) at a pH of 10.5, is delivered to the leaching tank from a storage tank 12. The leach solution is delivered over the top of the charge of thickened tailings in the leaching tank, and after percolating through them is withdrawn from the bottom of the tank.

The leaching tank is a closed vessel from which air is excluded. After receiving its charge of thickened tailings, the tank is substantially completely filled with leach solution, and then is closed to the ingress of air. In this fashion, leaching takes place under substantially non-oxidizing conditions.

Effluent leach solution containing a low concentration of dissolved copper may be passed to a recycle solution storage tank 13, whence it may be recycled through the leaching operation. When the concentration of dissolved copper in the effluent leaching solution has been built up to the desired near-saturation level (for example 5.5 grams per liter of dissolved copper), this rich solution is collected in a rich solution storage tank 14. Thereafter the charge in the leaching tank is washed with water and the initial effluent wash solution, containing for example about 1.2 grams per liter of dissolved copper and about 2.5 grams per liter total cyanide (as CN) is collected in an ends solution storage tank 15. Excess wash solution withdrawn from the leaching tank, containing little or no cyanide or copper, is discarded from the process; and likewise at the conclusion of the leaching operation the leached tailings, from which up to 85% of their copper content has been extracted, are discarded to waste.

In order to speed the rate of percolation, a vacuum is applied to the bottom of the leach tank through a scrubber 16 by a vacuum pump 17. To insure maximum possible recovery of cyanide, gases and vapors withdrawn from the circuit by the operation of the vacuum pump are collected by scrubbing with milk of lime in the scrubber 16. Gases and vapors not absorbed in the scrubber are discharged to waste.

The copper bearing rich solution and ends solution collected from the leaching operation are separately treated for precipitation of cuprous sulfide. The rich solution is passed from its storage tank 14 through a battery of rich precipitation vessels 18a, 18b and 18c arranged in series. The rich solution delivered to the first of these precipitation vessels flows serially through them. Carbon dioxide from a gas holder 19 is bubbled through the solution in the last of the precipitation vessels in the series, and thence is passed in countercurrent to the flow of solution through the solution in the other vessels 18b and 18c. The precipitation vessels are vigorously agitated, to insure rapid and effective dissolution of carbon dioxide in the solution. In the precipitation vessels the pH of the rich leach solution, which is about 10.5 when delivered to the first of such vessels, is reduced to about 5.7 by the time it has passed through the last of them, at which pH about 60% of the copper initially present is precipitated as cuprous sulfide and about 70% of the calcium content of the solution is precipitated as calcium carbonate. The effluent from the last precipitation vessel 18c thus is a slurry of precipitated cuprous sulfide and calcium carbonate in an aqueous cyanide solution at a slightly acid pH.

Effluent gases containing carbon dioxide and hydrogen cyanide passing from the vent of the first rich precipitation vessel 18a are delivered to a scrubber 20 wherein the carbon dioxide and hydrogen cyanide are absorbed in a countercurrent flow of milk of lime. Scrubbed gases are discharged to the atmosphere.

The slurry from the last of the rich precipitation vessels 18c is delivered to a hydrocyclone 21 in which it is substantially thickened. The vortex discharge from the hydrocyclone, which is substantially free of solids, is delivered to the storage vessel 13. This discharge solution contains the unprecipitated copper remaining in solution (for example 2 grams Cu per liter) and the cyanide regenerated by the carbon dioxide treatment of the rich leach solution. It is passed from the vessel 13 to the storage tank 12 where milk of lime is added to adjust its pH to a value suitable for use in leaching a further quantity of tailings.

The thickened underflow from the hydrocyclone 21 is transferred to a filter 22, where the precipitate of cuprous sulfide and calcium carbonate is separated. This precipitate constitutes one of the final products of the process, and is delivered to a copper smelter for recovery of its copper content. The filtrate from the filter 22 is treated as described below for the recovery and recycling of its reagent values.

The ends solution from the leaching operation is treated similarly to the rich solution, but in a separate circuit. This solution, which may contain typically about 1¼ grams per liter of dissolved copper as cuprocyanide complex, a few grams per liter of free cyanide, and calcium ions, at a pH of about 10.5, is delivered to the first of a series of two ends precipitation vessels 23a and 23b, and its flows serially through these two vessels. Carbon dioxide from the holder 19 is bubbled through the solution in the two precipitation vessels, passing in countercurrent to the flow of solution through them. The solution in these vessels is vigorously agitated. Precipitation of cuprous sulfide and calcium carbonate takes place in the same manner as in the rich precipitation vessels 18a, 18b, 18c. The effluent slurry from the final ends precipitation vessel 23b is at a pH of about 6.0, and contains much of its copper and calcium in the forms of precipitated cuprous sulfide and calcium carbonate. The solution also contains some dissolved copper (for example 0.5 gram per liter) in the form of cuprocyanide ions, and most of the cyanide values of the initial ends solution.

Gases discharged from the vent of the first ends precipitation vessel are passed through the scrubber 20 for the recovery of the carbon dioxide and hydrogen cyanide contained there. The effluent slurry from the final ends precipitation vessel passes to a hydrocyclone 24 where it is substantially dewatered. The thickened underflow from this hydrocyclone is combined with the underflow from the hydrocyclone 21 and is delivered to the filter 22 for separation and recovery of the precipitated cuprous sulfide and calcium carbonate.

The carbon dioxide employed for treatment of the leach solution in the precipitation vessels is advantageously derived from flue gases resulting from the combustion of a carbonaceous fuel (coal, fuel oil, or manufactured or natural gas). The flue gases are delivered to a carbon dioxide separation plant 25, where the carbon dioxide is separated from the nitrogen and thence delivered to the carbon dioxide storage holder 19. A portion of the nitrogen content of the flue gases, substantially freed from oxygen contamination, is separately collected and delivered to a nitrogen storage holder 26. This nitrogen is used to flush out the closed precipitation vessels 18 and 23 prior to delivery of leach solution thereto, so that there will be no substantial oxidation of the solution during conduct of the precipitation operations. It may also be used to flush out the leaching tank and other apparatus used in the process. As indicated above, oxidation of the leach solution is to be avoided in order to minimize loss of cyanide.

The filtrate from the filter 22, and the solids-free vortex discharge from the hydrocyclone 24, are delivered into a clean-up precipitation vessel 27. Here the pH of the united solutions is reduced to a distinctly acid value, preferably about 2.5, by the addition of sulfuric acid. At the same time, sodium hydrosulfide is added to build up the concentration of sulfide ions in the solution and thus promotes precipitation as cuprous sulfide of the copper content of the solution. Substantially all of the dissolved copper in the solutions passed through the clean-up precipitation vessel is precipitated by this treatment. A clean-up precipitation is not a necessary step of the process, but in the embodiment described it eliminates need for recycling dilute copper and cyanide bearing solutions through the process, and increases somewhat the amount of copper recovered per unit volume of solution handled.

The effluent slurry from the clean-up precipitation vessel, containing cuprous sulfide in suspension, and only a negligible amount of cuprocyanide together with a substantial amount of free cyanide in solution, is passed to a filter 28. The precipitate of cuprous sulfide and calcium sulfate is here separated from the residual solution. The separated precipitate constitutes a further product of this process and may be smelted directly for the recovery of its copper content. The amount of calcium sulfate present in this precipitate depends, of course, on the thoroughness with which calcium ions are separated during treatment of the leach solution with carbon dioxide. This in turn depends on the extent to which the pH was reduced in the rich and ends precipitation vessels 18 and 23. If, as in the exemplary process, the pH of the leach solution was reduced to slight acidity by the $CO_2$ treatment, the amount of calcium ions remaining in solution for precipitation as calcium sulfate in the clean-up precipitation will be quite small, and the contamination with calcium sulfate of the cuprous sulfide precipitated from the residual solution at the filter 28 will be correspondingly small.

Filtrate from the clean-up precipitate filter 28, at a pH of about 2.5, is introduced at the top of a stripping tower 29. As it passes down through this tower, it encounters a rising current of gas delivered into the base of the tower by a blower 30. The rising gas current sweeps out the hydrogen cyanide content of the acid filtrate solution. The stripped solution, discharged at the base of the tower and containing only negligible amounts of cyanide and dissolved copper, is discharged to waste (after treatment if necessary to completely detoxify any residual cyanide).

Gases effluent from the top of the stripping tower 29 are delivered to the base of an absorption tower 31, through which a milk of lime suspension descends. Hydrogen cyanide in the rising gas current is absorbed in this alkaline solution. The gases not absorbed at the top of the absorption tower 31 are recycled by the blower 30 through the circuit comprising the stripping and absorption towers. Alkaline cyanide solution is withdrawn from the base of the absorption tower and is passed to the recycle solution storage vessel 13, whence it is delivered to the storage tank 12 in which whatever necessary adjustment in its pH can be made by the addition of milk of lime. Here also HCN may be added to make up for process losses and to adjust the cyanide content of the solution from the cyanide recovery system.

An agitated vessel 32 is provided for slaking lime, to produce a milk of lime slurry or a lime solution suitable for use at the various locations where treatment of a solution or scrubbing of a gas with lime is required. The slaked lime solution or slurry, in addition to flowing down through the HCN absorption tower 31, is also delivered through suitable conduits (not indicated on the flow sheet) to points marked Ⓐ where a lime treatment is required. Also, the lime slaking vessel 32 receives, through conduits not indicated on the flow sheet, the effluent solutions indicated at points Ⓑ from the gas scrubbers 16 and 20. The substantial excess of lime and the recovered cyanide in these effluent solutions thus is collected for recycling through the process.

It is apparent from the foregoing that the process of this invention is amenable to a wide variety of modifications to suit various circumstances. The process is admirably suited for treatment of a wide variety of sulfidic copper bearing materials containing copper in the cuprous state, including materials in which the metal values are too low for economical recovery in any other fashion. The process of the invention is not limited, however, to the treatment of very low grade materials. It can with advantage be applied directly to the treatment of sulfidic ores, and makes possible the recovery from such ores of a product which can be smelted directly in a converter, eliminating the usual operations of concentrating, roasting and matte smelting. It is particularly advantageous for the direct treatment of sulfidic ores which present a substantial concentration problem on account of extremely fine dissemination of sulfide minerals in the gangue material. The new process may even be used in some instances with advantage for the treatment of flotation concentrates, in order to produce a cuprous sulfide product for direct converter smelting without going through the usual roasting or matte smelting operations. Since the process is hydrometallurgical in character, involving no high temperature operations, it lends itself to a high degree of automated operation and control and a minimum of operating labor. The versatility of the process and the wide variety of materials which it can be employed to treat thus impart to it the characteristics of a basically new metallurgical tool for the recovery of copper from an important segment of cupriferous raw materials.

We claim:

1. The method of treating sulfidic material containing copper in the cuprous form which comprises leaching such material under substantially non-oxidizing conditions with an aqueous calcium cyanide solution having a pH varying from 9 to 11.5, separating the pregnant leach solution from the leached residue, reducing the pH by adding an acidic reagent of the group consisting of carbon dioxide and sulfuric acid, whereby cuprous sulfide is precipitated therefrom, and recovering the precipitated sulfide.

2. The method according to claim 1, in which the pregnant solution is treated with a soluble sulfide to increase the sulfide ion concentration therein and thus promote precipitation of cuprous sulfide.

3. The method of treating sulfidic mineral material containing copper in the cuprous form which comprises leaching such material in a closed vessel from which air is substantially excluded to provide non-oxidizing conditions with an aqueous alkaline cyanide solution at a pH substantially above 7.4, separating the pregnant leach solution from the leached residue, treating the separated pregnant solution with carbon dioxide gas under a pressure of at least 2 atmospheres until its pH has been reduced to a value below 7.4, whereby cuprous sulfide is precipitated, recovering the precipitated cuprous sulfide from the residual cyanide bearing solution, alkalizing the cyanide of said residual solution with lime, and recycling the resulting alkaline cyanide solution for reuse in the leaching operation.

4. The method according to claim 3, in which the pH of the pregnant solution is reduced eventually to about 3.0 by addition of sulfuric acid, whereby substantially all the copper dissolved therein is precipitated.

5. The method according to claim 3, in which the pregnant solution is treated with carbon dioxide at a relatively low pressure in a first precipitation stage, the first precipitate hereby formed is separated from the solution, the residual solution is further treated with carbon dioxide at a relatively higher pressure in a second precipitation stage, and the second precipitate thereby formed is separated from the solution.

6. The method according to claim 5, in which the pH of the pregnant solution is reduced only to about 7.4 in the first precipitation stage, whereby the first precipitate is essentially only calcium carbonate.

7. The method according to claim 5, in which the pH of the pregnant solution is reduced to between 5.0 and 6.5 in the first precipitation stage, whereby the first precipitate is a mixture of cuprous sulfide and calcium carbonate containing a relatively high proportion of calcium carbonate.

8. The method according to claim 5, in which the pH of the solution is reduced to between 2.5 and 3.0 in the second precipitation stage, whereby substantially all copper present in the solution is precipitated.

9. The method of treating sulfidic mineral material containing copper in the cuprous form which comprises introducing a charge of such material together with lime into a closed vessel from which air is substantially excluded to provide non-oxidizing conditions, leaching such charge with an aqueous alkaline cyanide solution, separating the pregnant leach solution having a pH in the range from 9.5 to 11.5 from the leached residue, reducing the pH of the separated pregnant solution to a value below 6.5 by adding an acidic reagent of the group consisting of carbon dioxide and sulfuric acid, whereby cuprous sulfide is precipitated from said solution, recovering the precipitated cuprous sulfide, thereafter alkalizing with lime the cyanide content of the residual solution, and recycling the resulting alkaline cyanide solution for reuse in the 10. The method of treating sulfidic material containing copper in the cuprous form which comprises leaching such material under substantially non-oxidizing conditions with an aqueous cyanide solution containing calcium ions, separating the pregnant leach solution having a pH above 9.5 from the leached residue, dissolving carbon dioxide in the separated pregnant solution in a first precipitation stage until the pH thereof is reduced to between 5.0 and 6.5, separating calcium carbonate and cuprous sulfide thereby precipitated from the pregnant solution, thereafter dissolving additional carbon dioxide in the pregnant solution in a second precipitation stage until the pH thereof is reduced to between 2.5 and 3.0, whereby substantially all remaining copper is precipitated therefrom, recovering the cupriferous precipitates from the residual cyanide bearing solution, treating the cyanide of said residual solution with lime to form an alkaline cyanide solution, and recycling the resulting alkaline cyanide solution for use in leaching a further portion of sulfidic copper bearing material.

11. The method according to claim 10, in which the pregnant leach solution is withdrawn from the leached residue at a pH in the range from 10 to 11.5.

12. The method according to claim 10 in which the pregnant solution is treated in the first precipitation stage with carbon dioxide at a pressure in the range from 2 to 5 atmospheres.

13. The method according to claim 10, in which the pregnant solution is treated in the second precipitation stage with carbon dioxide at a pressure in the range from 6 to 10 atmospheres.

References Cited by the Examiner
UNITED STATES PATENTS

| | | | |
|---|---|---|---|
| 900,186 | 10/1908 | Merrill | 75—100 |
| 1,226,190 | 5/1917 | Cox | 23—135 |
| 1,654,918 | 1/1928 | Buchanan et al. | 75—106 |

BENJAMIN HENKIN, *Primary Examiner.*

MAURICE A. BRINDISI, *Examiner.*